United States Patent [19]

Kawakita

[11] Patent Number: 5,336,137
[45] Date of Patent: * Aug. 9, 1994

[54] SEAT RECLINING MECHANISM

[75] Inventor: Tadashi Kawakita, Kanagawa, Japan

[73] Assignee: Ikeda Bussan Co., Ltd., Ayase, Japan

[ * ] Notice: The portion of the term of this patent subsequent to Feb. 2, 2010 has been disclaimed.

[21] Appl. No.: 903,961

[22] Filed: Jun. 26, 1992

[30] Foreign Application Priority Data

Jun. 28, 1991 [JP] Japan .................. 3-057878[U]

[51] Int. Cl.⁵ .................. F16H 1/28; B60N 2/10
[52] U.S. Cl. .................. 475/347; 475/341; 297/362
[58] Field of Search ........... 475/331, 334, 338, 339, 475/340, 341, 347; 297/354, 362, 348

[56] References Cited

U.S. PATENT DOCUMENTS

| | | | |
|---|---|---|---|
| 3,081,648 | 3/1963 | Duer | 475/347 X |
| 4,882,943 | 11/1989 | Pipon et al. | 475/347 X |
| 5,098,359 | 3/1992 | Chales et al. | 297/362 X |
| 5,183,447 | 2/1993 | Kawakita | 475/341 |

FOREIGN PATENT DOCUMENTS

| | | | |
|---|---|---|---|
| 3701729 | 8/1988 | Fed. Rep. of Germany | 475/347 |
| 3729134 | 3/1989 | Fed. Rep. of Germany | 297/362 |
| 58-26602 | 6/1983 | Japan . | |
| 60-187645 | 12/1985 | Japan . | |
| 60-187646 | 12/1985 | Japan . | |
| 63-186604 | 8/1988 | Japan . | |
| 229138 | 9/1989 | Japan | 475/347 |
| 2215596A | 9/1989 | United Kingdom . | |
| 2229910 | 10/1990 | United Kingdom | 297/362 |
| 2234550A | 2/1991 | United Kingdom . | |
| 2248481A | 4/1992 | United Kingdom . | |

Primary Examiner—Leslie A. Braun
Assistant Examiner—Khoi Ta
Attorney, Agent, or Firm—Foley & Lardner

[57] ABSTRACT

A seat reclining mechanism for adjusting the angular position of a seatback relative to a seat cushion by a planetary gear arrangement includes a rotatable shaft, a base plate, a pivotable arm, a control gear, a plurality of planetary gears, and a supporting member. The pivotable arm is rotatably connected to the base plate through the rotatable shaft. Each planetary gear has two opposed cylindrical projections which are outwardly biased by the supporting member against cylindrical smooth surfaces of cylindrical recesses formed on the base plate and the pivotable arm. Therefore, the planetary gears are held in a predetermined revolution orbit around the control gear.

22 Claims, 3 Drawing Sheets

SEAT RECLINING MECHANISM

BACKGROUND OF THE INVENTION

1. Field of the Invention

The present invention relates in general to a seat reclining mechanism, and more particularly to a seat reclining mechanism for adjusting the angular position of a seatback relative to a seat cushion by a planetary gear arrangement.

2. Description of the Prior Art

Hitherto, various types of seat reclining mechanism have been proposed for adjusting the angular position of a seatback relative to a seat cushion, which include a type of mechanism to adjust the angular position by a planetary gear arrangement. With this type of mechanism, the angular position of a seatback can be steplessly adjusted relative to a seat cushion.

For example, Japanese Utility Model First Provisional Publication 60-187645 discloses a seat reclining mechanism which employs a planetary gear arrangement. This seat reclining mechanism comprises a base plate, a pivotable arm, a rotatable shaft, two control gears, four planetary gears and a supporting plate. The base plate and the pivotable arm are pivotally interconnected by the rotatable shaft. The base plate and the pivotable arm have circular recesses respectively, which are generally opposed to each other. The base plate and the pivotable arm are respectively formed with ring gears at cylindrical surfaces defined by the circular recesses. The control gears are mounted on the rotatable shaft, and one of them is selectively fixed to the rotatable shaft so as to be rotatable therewith. The planetary gears are meshed with the control gears and with the ring gears surrounding the planetary gears. Each planetary gear has larger-diameter and smaller-diameter toothed portions. The supporting plate is rotatably mounted on the rotatable shaft. The supporting plate is generally disklike in shape and has four concave depressions by each of which the smaller-diameter toothed portion of the planetary gear is held in a predetermined revolution orbit around the control gears. However, the seat reclining mechanism has the following drawbacks.

The seat reclining mechanism has an unsatisfactory durability due to abrasion of the smaller-diameter toothed portion of the planetary gear and/or the supporting plate. It is necessary to apply a relatively large torque to rotate the rotatable shaft due to friction between the smaller-diameter toothed portion of the planetary gear and the supporting plate.

SUMMARY OF THE INVENTION

It is therefore a general object of the present invention to provide a seat reclining mechanism which has an improved durability as compared with the above-mentioned conventional seat reclining mechanism.

It is a more specific object of the present invention to provide a seat reclining mechanism in which friction between a supporting member and planetary gears is substantially reduced as compared with the conventional seat reclining mechanism.

According to the present invention, there is provided a seat reclining mechanism including; a rotatable shaft; a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess; a pivotable arm which has a second through hole for receiving said rotatable shaft therein, said pivotable arm having at a major surface thereof a second cylindrical recess which is united with said first cylindrical recess so as to define a substantially cylindrical space between said base plate and said pivotable arm, said pivotable arm having a second ring gear at a cylindrical surface defined by said second cylindrical recess, at least one of said base plate and said pivotable arm having a third cylindrical recess which is merged with one of said first and second cylindrical recesses and coaxial with said rotatable shaft, said third cylindrical recess defining a cylindrical smooth surface; a control gear securely and coaxially mounted on said rotatable shaft, said control gear being received in said cylindrical space; a planetary gear which has a toothed portion and a cylindrical projection, said toothed portion being received in said cylindrical space and meshed with said first and second ring gears and said control gear, said cylindrical projection being formed on a rotation center of said planetary gear and received in said third cylindrical recess; and means for outwardly biasing said cylindrical projection of said planetary gear, with a certain predetermined force, against said cylindrical smooth surface of said third cylindrical recess, such that said planetary gear is held in a predetermined revolution orbit around said control gear.

By virtue of the provision of the supporting member and the cylindrical projections which are supported by the supporting member, it is made possible to obtain smooth rotation of the planetary gears in a predetermined revolution orbit. Thus, it is further made possible to obtain proper meshed conditions between the planetary gears and the ring gears and between the planetary gears and the control gear, thereby improving durability of the seat reclining mechanism.

DESCRIPTION OF THE PREFERRED INVENTION

Referring to FIGS. 1 to 5, there is shown a seat reclining mechanism, which is a first embodiment of the present invention.

As is known, a seatback (not shown) of a seat (not shown) is rotated to a desired angular position relative to a seat cushion (not shown) of the seat through the seat reclining mechanism.

Figure 1:
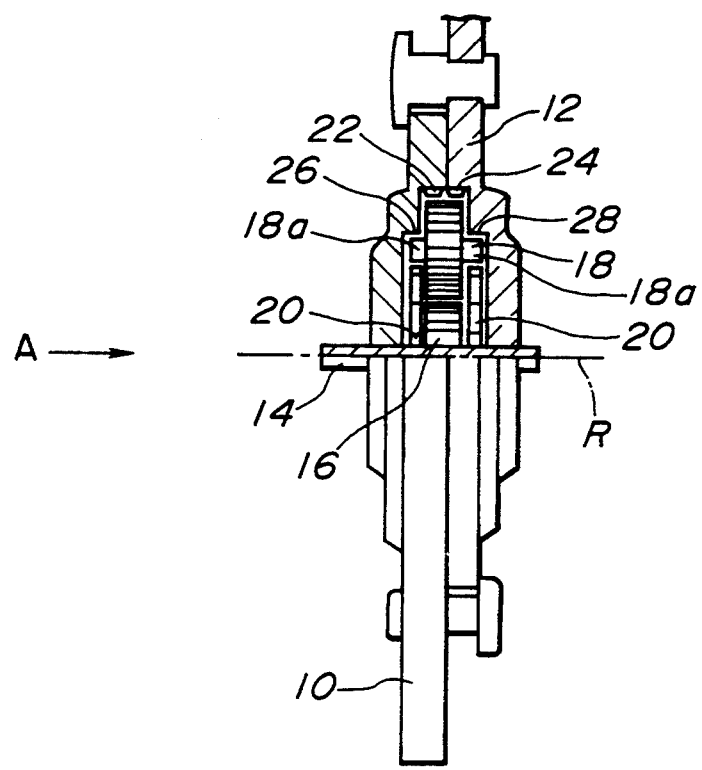
FIG. 1 is a rear elevational, but partly sectioned, view of a seat reclining mechanism of a first embodiment in accordance with the present invention.
Figure 2:
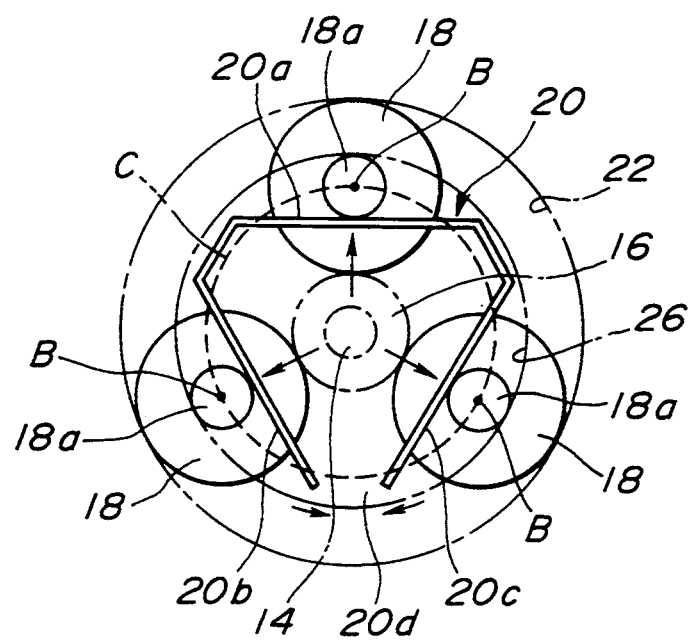
FIG. 2 is a side elevational and cutaway view which is taken from a direction along an arrow "A" of FIG. 1, showing planetary gears supported by a supporting member according to the first embodiment.

As is seen from FIGS. 1 and 2, the seat reclining mechanism comprises a base plate 10, a pivotable arm 12, a rotatable shaft 14, a control gear 16, a plurality of planetary gears 18 (three planetary gears in this embodiment) and two supporting members 20.

The base plate 10 and the pivotable arm 12 are secured to the seat cushion and the seatback, respectively. The base plate 10 and the pivotable arm 12 are respectively formed with circular through holes (no numerals) which are horizontally aligned with each other, for receiving the rotatable shaft 14 therein. Thus, the rotatable shaft 14 is rotatably held by the base plate 10 and the pivotable arm 12. As will be clarified as the description proceeds, the pivotable arm 12 rotates slowly about a rotational axis "R" of the rotatable shaft 14 by the rotation of the rotatable shaft 14. To rotate the rotatable shaft 14, for example, a manual control lever (not shown) is fixed to an outer end portion of the rotatable shaft 14, or an electric motor (not shown) is operatively connected to an inner end portion of the rotatable shaft 14.

The base plate 10 and the pivotable arm 12 are respectively formed with stepped notches for receiving therein the planetary gears 18, the control gear 16 and the supporting members 20. The stepped notches are united and symmetrically disposed with each other. Each stepped notch consists of a larger circular space and a smaller circular space. The larger and smaller circular spaces are disposed about the rotational axis "R" of the rotatable shaft 14.

There are provided ring gears 22 and 24 on cylindrical surfaces defined by the larger circular spaces. The ring gears 22 and 24 are disposed side-by-side with each other, and have the same addendum circle but a different number of teeth. However, if desired, it is optional to provide ring gears which have different addendum circles, such that stepwise planetary gears having larger and smaller toothed portions are properly meshed with the ring gears.

The control gear 16 is coaxially mounted on the rotatable shaft 14 and integrally rotatable therewith. If desired, the control gear 16 may be monolithically formed on the rotatable shaft 14.

A toothed portion (no numeral) of the planetary gear 18 is operatively meshed with the control gear 16. Each planetary gear 18 is also meshed with the ring gears 22 and 24 of which total width is substantially the same as the thickness of the toothed portion of the planetary gear 18. The toothed portion of the planetary gear 18 and the control gear 16 have the same thickness which is defined in a horizontal direction. The planetary gears 18 are radially aligned with the control gear 16, and equidistantly disposed from each other about the control gear 16. Each planetary gear 18 is formed with two opposed cylindrical projections 18a which are disposed about a rotational axis "B" of the planetary gear 18. Each projection 18a has a smooth cylindrical surface which is in abutment with a smaller cylindrical surface 26 or 28 defined by the smaller circular space.

The aforementioned supporting member 20 is generally triangular in shape, and has first, second and third flat portions 20a, 20b and 20c. The supporting member 20 is made of a metal plate, a metal wire or the like. There is provided a gap 20d between free ends of the second and third flat portions 20b and 20c. The supporting member 20 is resiliently compressed so as to narrow the gap 20d and to be in abutment at the first, second and third portions 20a, 20b and 20c with the cylindrical projections 18a of the planetary gears 18. Under this condition, the cylindrical projections 18a of the planetary gears 18 are outwardly pressed or biased against the smaller cylindrical surfaces 26 and 28. It should be noted that pressing force of the supporting member 20 is adjusted so as to allow the cylindrical projection 18a of the planetary gear 18 to smoothly rotate on the first, second or third portion 20a, 20b or 20c of the supporting member 20 and on the smaller cylindrical surface 26 or 28, while the planetary gears 18 revolve around the control gear 16.

In operation, when the rotatable shaft 14 is rotated, the control gear 16 is integrally rotated therewith and motion is transmitted through the planetary gears 18 to the ring gears 22 and 24. In fact, if the control gear 16 is rotated in one direction, the planetary gears 18 revolve around the control gear 16 together with the supporting members 20 in the one direction, such that the rotational axis "B" of the planetary gear 18 revolves in a revolution orbit "C" thereof. At the same time, each planetary gear 18 is rotated on its own axis in the other direction, with keeping abutment at the cylindrical projections 18a with the supporting members 20 and the smaller cylindrical surfaces 26 and 28. Since the ring gears 22 and 24 have a different number of teeth, rotation of the planetary gears 18 causes rotation of the ring gear 24 relative to the ring gear 22. Therefore, a small angular movement of the pivotable arm 12 is effected. Thus, the seatback pivots slowly and steplessly in a forward or rearward direction relative to the seat cushion.

When rotation of the rotatable shaft 14 is stopped, the seatback stops at an angular position. Under this stopped condition, the seatback does not move even when the same is applied with an external force. This is because of the great speed reduction ratio possessed by the seat reclining mechanism. Thus, the seatback is kept at a desired position as long as the rotatable shaft 14 is at a standstill.

Figure 3:
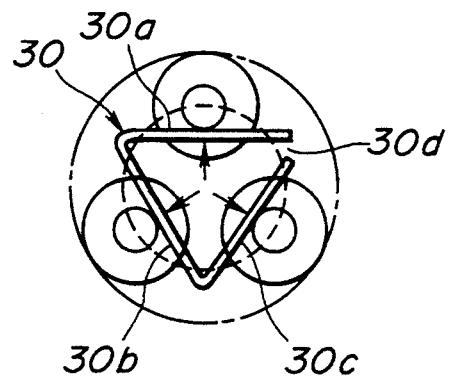
FIG. 3 is a view similar to FIG. 2, but showing a first modification of the supporting member.

As is seen from FIG. 3, there is provided a first modification of the supporting member 20. This modified supporting member 30 is triangular in shape, and has first, second and third flat portions 30a, 30b and 30c. There is provided a gap 30d between the first and third portions 30a and 30c so as to be resiliently compressed.

Figure 4:
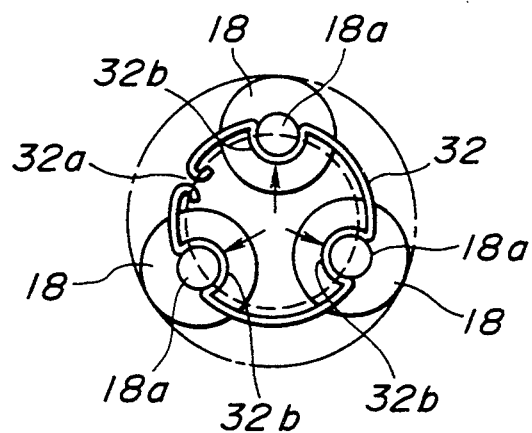
FIG. 4 is a view similar to FIG. 2, but showing a second modification of the supporting member.

As is seen from FIG. 4, there is provided a second modification of the supporting member. This modified supporting member 32 is generally circular in shape. The supporting member 32 is made of a metal wire or the like, and has a gap 32a between two free ends thereof so as to be resiliently compressed. The supporting member has three semicircular concave portions 32b. The circular cylindrical projections 18a of the planetary gears 18 are rotatably received in the semicircular concave portions 32b of the supporting member 32.

Figure 5:
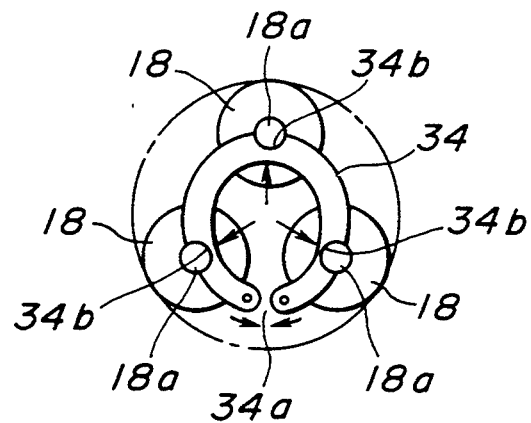
FIG. 5 is a view similar to FIG. 2, but showing a third modification of the supporting member.

As is seen from FIG. 5, there is provided a third modification of the supporting member. This modified supporting member 34 is generally C-shaped, and has a gap 34a between two ends thereof so as to be resiliently compressed. The supporting member has three semicircular notches 34b. The cylindrical projections 18a of the planetary gears 18 are rotatably received in the notches 34b.

Figure 6:
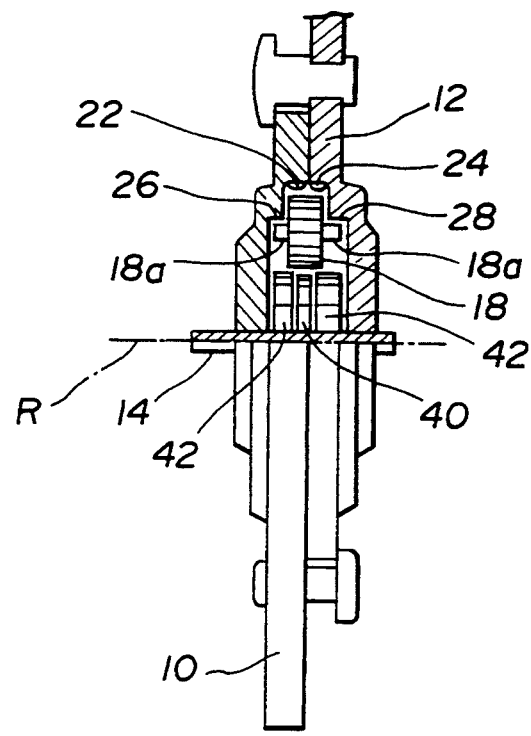
FIG. 6 is a view similar to FIG. 1, but showing a second embodiment in accordance with the present invention.
Figure 7:
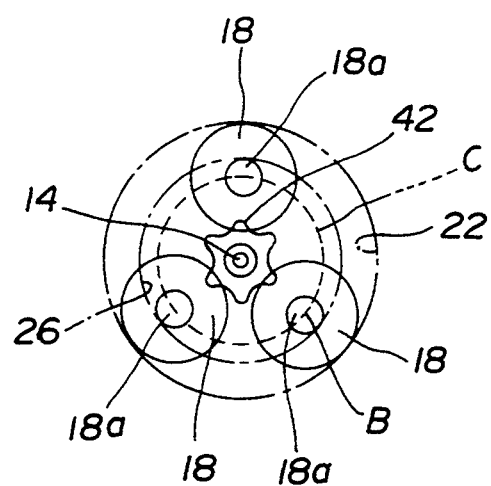
FIG. 7 is a view similar to FIG. 2, but showing planetary gears supported by a supporting member according to the second embodiment.

Referring to FIGS. 6 and 7, there is shown a seat reclining mechanism, which is a second embodiment of the present invention.

For ease of description, parts and constructions substantially identical to those of the aforementioned first embodiment will be denoted by the same numerals, and detailed explanation of them will be omitted from the following.

Designated by numeral 40 is a control gear of which thickness defined along the rotational axis "R" is smaller than that of the toothed portion of each planetary gear 18. The control gear is interposed between two supporting members 42 which are rotatably coaxially mounted on the rotatable shaft 14. Each supporting member is made of resilient material and has the same number of teeth as that of the control gear 40. Each planetary gear 18 is meshed with the control gear 40 and the two supporting members 42, as illustrated. The supporting member 42 is so sized that each planetary gear 18 is radially outwardly biased by the supporting member 42 with a certain desired force. Under this condition, the cylindrical projection 18a of the planetary gear 18 is pressed against the smaller cylindrical surface 26 or 28 of the base plate 10 or the pivotable arm 12. It is optional to omit one of the two supporting members 42.

The advantages of the seat reclining mechanism of the present invention will be described in the following.

Since each cylindrical projection of the planetary gears is outwardly pressed by the supporting member with a certain desired force against the cylindrical surface defined by the smaller cylindrical space, each planetary gear 18 is held in a revolution orbit thereof. Therefore, abrasion of teeth of the planetary gears are substantially reduced as compared with the aforementioned conventional seat reclining mechanism. Thus, durability of the seat reclining mechanism is substantially improved.

Since the planetary gears are smoothly rotatably supported by the supporting member, torque to be applied to the rotatable shaft 14 can be reduced as compared with the conventional reclining mechanism.

What is claimed is:

1. A seat reclining mechanism comprising:
   a rotatable shaft;
   a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;
   a pivotable arm which has a second through hole for receiving said rotatable shaft therein, said pivotable arm having at a major surface thereof a second cylindrical recess which is united with said first cylindrical recess so as to define a substantially cylindrical space between said base plate and said pivotable arm, said pivotable arm having a second ring gear at a cylindrical surface defined by said second cylindrical recess, at least one of said base plate and said pivotable arm having a third cylindrical recess which is merged with one of said first and second cylindrical recesses and coaxial with said rotatable shaft, said third cylindrical recess defining a cylindrical smooth surface;
   a control gear securely and coaxially mounted on said rotatable shaft, said control gear being received in said cylindrical space;
   a planetary gear which has a toothed portion and a cylindrical projection, said toothed portion being received in said cylindrical space and meshed with said first and second ring gears and said control gear, said cylindrical projection being formed on a rotation center of said planetary gear and received in said third cylindrical recess; and
   an elongate resilient member which applies a predetermined force to said planetary gear thereby outwardly biasing said cylindrical projection of said planetary gear against said cylindrical smooth surface of said third cylindrical recess, such that said planetary gear is held in a predetermined revolution orbit around said control gear, said elongate resilient member being spaced from said rotatable shaft.

2. A seat reclining mechanism as claimed in claim 1, in which said control gear an said toothed portion of said planetary gear have the same thickness which is defined along an axis of said rotatable shaft so as to achieve fully meshed condition therebetween.

3. A seat reclining mechanism as claimed in claim 1, in which said cylindrical projection of said planetary gear is rotatably biased against said cylindrical smooth surface.

4. A seat reclining mechanism as claimed in claim 1, in which said first and second ring gears are disposed side-by-side with each other, and have the same addendum circle but a different number of teeth.

5. A seat reclining mechanism as claimed in claim 1, in which said cylindrical projection is rotatably held with no play between said elongate resilient member and said cylindrical smooth surface of said third cylindrical recess.

6. A seat reclining mechanism as claimed in claim 1, further comprising two other planetary gears which are identical with said previous planetary gear in construction; said three planetary gears being equidistantly spaced about said control gear.

7. A seat reclining mechanism as claimed in claim 6, in which said elongate resilient member is generally triangular in shape.

8. A seat reclining mechanism as claimed in claim 1, wherein said elongate resilient member applies said predetermined force to said cylindrical projection.

9. A seat reclining mechanism comprising:
   a rotatable shaft;
   a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;
   a pivotable arm which has a second through hole for receiving said rotatable shaft therein, said pivotable arm having at a major surface thereof a second cylindrical recess which is united with said first cylindrical recess so as to define a substantially cylindrical space between said base plate and said pivotable arm, said pivotable arm having a second ring gear at a cylindrical surface defined by said second cylindrical recess, at least one of said base plate and said pivotable arm having a third cylindrical recess which is merged with one of said first and second cylindrical recesses and coaxial with said rotatable shaft, said third cylindrical recess defining a cylindrical smooth surface;

a control gear securely and coaxially mounted on said rotatable shaft, said control gear being received in said cylindrical space;

a planetary gear which has a toothed portion and a cylindrical projection, said toothed portion being received in said cylindrical space and meshed with said first and second ring gears and said control gear, said cylindrical projection being formed on a rotation center of said planetary gear and received in said third cylindrical recess; and means for outwardly biasing said cylindrical projection of said planetary gear, with a certain predetermined force, against said cylindrical smooth surface of said third cylindrical recess, such that said planetary gear is held in a predetermined revolution orbit around said control gear;

wherein said biasing means comprises a biasing gear made of a resilient material, said biasing gear is positioned adjacent to said control gear and is meshed with said planetary gear, and said biasing gear and said control gear have a same number of teeth.

10. A seat reclining mechanism comprising:
a rotatable shaft;
a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;

a pivotable arm which has a second through hole for receiving said rotatable shaft therein, said pivotable arm having at a major surface thereof a second cylindrical recess which is united with said first cylindrical recess so as to define a substantially cylindrical space between said base plate and said pivotable arm, said pivotable arm having a second ring gear at a cylindrical surface defined by said second cylindrical recess, at least one of said base plate and said pivotable arm having a third cylindrical recess which is merged with one of said first and second cylindrical recesses and coaxial with said rotatable shaft, said third cylindrical recess defining a cylindrical smooth surface;

a control gear securely and coaxially mounted on said rotatable shaft, said control gear being received in said cylindrical space;

a planetary gear which has a toothed portion and a cylindrical projection, said toothed portion being received in said cylindrical space and meshed with said first and second ring gears and said control gear, said cylindrical projection being formed on a rotation center of said planetary gear and received in said third cylindrical recess; and an elongate resilient member which applies a predetermined force to said planetary gear thereby outwardly biasing said cylindrical projection of said planetary gear against said cylindrical smooth surface of said third cylindrical recess, such that said planetary gear is held in a predetermined revolution orbit around said control gear.

11. A seat reclining mechanism comprising:
a rotatable shaft;
a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;

a pivotable arm which has a second through hole for receiving said rotatable shaft therein, said pivotable arm having at a major surface thereof a second cylindrical recess which is united with said first cylindrical recess so as to define a substantially cylindrical space between said base plate and said pivotable arm, said pivotable arm having a second ring gear at a cylindrical surface defined by said second cylindrical recess, at least one of said base plate and said pivotable arm having a third cylindrical recess which is merged with one of said first and second cylindrical recesses and coaxial with said rotatable shaft, said third cylindrical recess defining a cylindrical smooth surface;

a control gear securely and coaxially mounted on said rotatable shaft, said control gear being received in said cylindrical space;

a planetary gear which has a toothed portion and a cylindrical projection, said toothed portion being received in said cylindrical space and meshed with said first and second ring gears and said control gear, said cylindrical projection being formed on a rotation center of said planetary gear and received in said third cylindrical recess; and means for outwardly biasing said cylindrical projection of said planetary gear, with a certain predetermined force, against said cylindrical smooth surface of said third cylindrical recess, such that said planetary gear is held in a predetermined revolution orbit around said control gear.

12. A seat reclining mechanism as claimed in claim 11, in which said control gear and said toothed portion of said planetary gear have the same thickness which is defined along an axis of said rotatable shaft so as to achieve a fully meshed condition therebetween.

13. A seat reclining mechanism as claimed in claim 11, in which said cylindrical projection of said planetary gear is rotatably biased against said cylindrical smooth surface.

14. A seat reclining mechanism as claimed in claim 11, in which said first and second ring gears are disposed side-by-side with each other, and have a same addendum circle but a different number of teeth.

15. A seat reclining mechanism as claimed in claim 11, in which said cylindrical projection is rotatably held with no play between said biasing means and said cylindrical smooth surface of said third cylindrical recess.

16. A seat reclining mechanism as claimed in claim 11, further comprising two other planetary gears which are identical with said planetary gear in construction, said three planetary gears being equidistantly spaced about said control gear.

17. A seat reclining mechanism as claimed in claim 16, in which said biasing means comprises a resilient member which is generally triangular in shape.

18. A seat reclining mechanism as claimed in claim 11, in which said biasing means comprises a resilient member which is generally circular in shape and has a notch in which said cylindrical projection is rotatably fit.

19. A seat reclining mechanism as claimed in claim 11, wherein said biasing means applies said predetermined force to said cylindrical projection.

20. A seat reclining mechanism as claimed in claim 11, wherein said biasing means is a wire.

21. A seat reclining mechanism comprising:

a rotatable shaft;

a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;

a pivotable arm which has a second through hole for receiving said rotatable shaft therein, said pivotable arm having at a major surface thereof a second cylindrical recess which is united with said first cylindrical recess so as to define a substantially cylindrical space between said base plate and said pivotable arm, said pivotable arm having a second ring gear at a cylindrical surface defined by said second cylindrical recess, at least one of said base plate and said pivotable arm having a third cylindrical recesses which is merged with one of said first and second cylindrical recesses and coaxial with said rotatable shaft, said third cylindrical recess defining a cylindrical smooth surface;

a control gear securely and coaxially mounted on said rotatable shaft, said control gear being received in said cylindrical space;

a planetary gear which has a toothed portion and a cylindrical projection, said toothed portion being received in said cylindrical space and meshed with said first and second ring gears and said control gear, said cylindrical projection being formed on a rotation center of said planetary gear and received in said third cylindrical recess; and an elongate resilient member which applies a predetermined force to said planetary gear thereby outwardly biasing said cylindrical projection of said planetary gear against said cylindrical smooth surface of said third cylindrical recess, such that said planetary gear is held in a predetermined revolution orbit around said control gear, said elongate resilient member being spaced from said rotatable shaft and being generally circular in shape and having a notch in which said cylindrical projection is rotatably fit.

22. A seat reclining mechanism comprising:

a rotatable shaft;

a base plate which has a first through hole for receiving said rotatable shaft therein, said base plate having at a major surface thereof a first cylindrical recess which is coaxial with said rotatable shaft, said base plate having a first ring gear at a cylindrical surface defined by said first cylindrical recess;

a pivotable arm which has a second through hole for receiving said rotatable shaft therein, said pivotable arm having at a major surface thereof a second cylindrical recess which is united with said first cylindrical recess so as to define a substantially cylindrical space between said base plate and said pivotable arm, said pivotable arm having a second ring gear at a cylindrical surface defined by said second cylindrical recess, at least one of said base plate and said pivotable arm having a third cylindrical recess which is merged with one of said first and second cylindrical recesses and coaxial with said rotatable shaft, said third cylindrical recess defining a cylindrical smooth surface;

a control gear securely and coaxially mounted on said rotatable shaft, said control gear being received in said cylindrical space;

a planetary gear which has a toothed portion and a cylindrical projection, said toothed portion being received in said cylindrical space and meshed with said first and second ring gears and said control gear, said cylindrical projection being formed on a rotation center of said planetary gear and received in said third cylindrical recess; and an elongate resilient wire member which applies a predetermined force to said planetary gear thereby outwardly biasing said cylindrical projection of said planetary gear against said cylindrical smooth surface of said third cylindrical recess, such that said planetary gear is held in a predetermined revolution orbit around said control gear, said elongate resilient wire member being spaced from said rotatable shaft.

* * * * *